June 29, 1954  E. M. STOLZ  2,682,180
METHOD OF REPOINTING CUTTER BITS
Filed Feb. 14, 1951  2 Sheets-Sheet 1
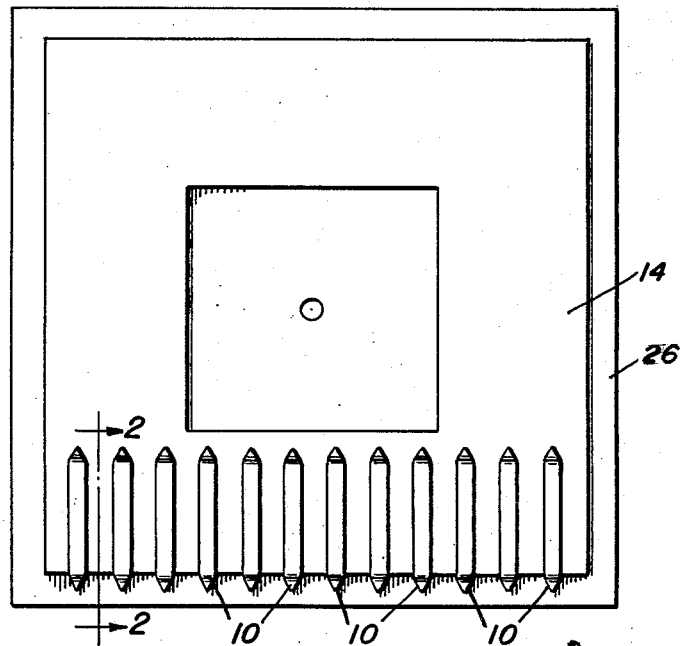
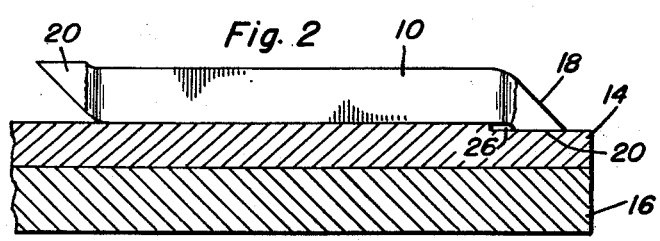
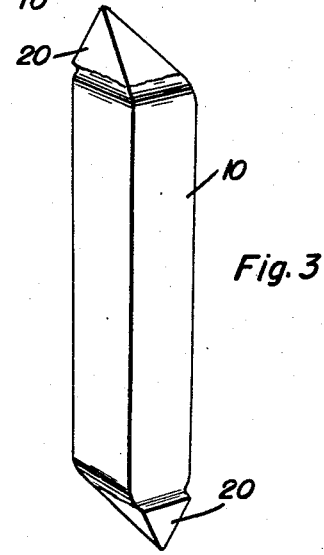
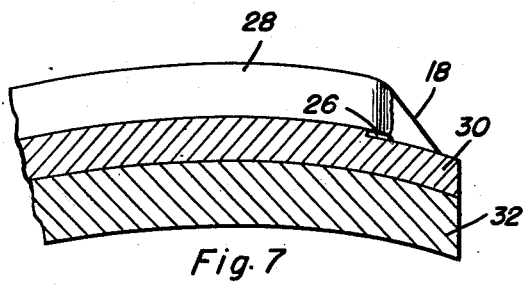
Elmer M. Stolz
INVENTOR.
BY *[signatures]*
Attorneys June 29, 1954  E. M. STOLZ  2,682,180
METHOD OF REPOINTING CUTTER BITS
Filed Feb. 14, 1951  2 Sheets-Sheet 2
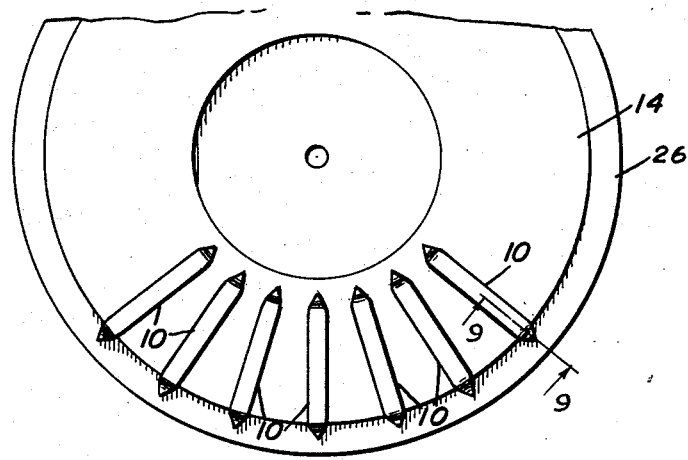
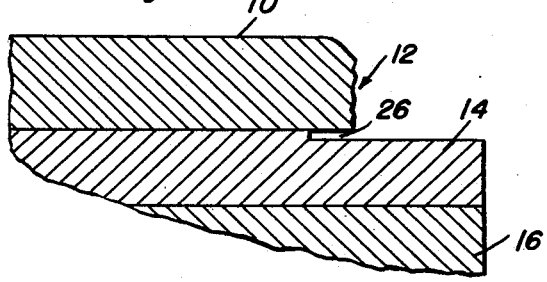
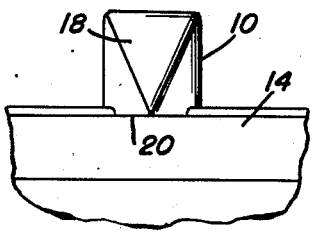
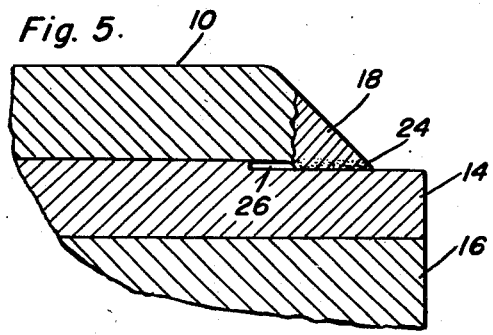
Elmer M. Stolz
INVENTOR.

Patented June 29, 1954

2,682,180

UNITED STATES PATENT OFFICE 2,682,180

METHOD OF REPOINTING CUTTER BITS

Elmer M. Stolz, Nokomis, Ill.

Application February 14, 1951, Serial No. 210,816

11 Claims. (Cl. 76—101)

This invention relates to machine tools and more particularly to a method of facing tool bits, and the resulting tool bits thus produced.

It is an object of this invention to provide a method of manufacturing and rebuilding tool bits, such as the worn cutting edges of mining machine tool bits and the like.

Another object of the invention is to provide a method for rebuilding the dull or worn end of a cutter bit or drill bit, whereby the same is brought back to its original length, by replacing the metal that was worn away.

Another object of the invention envisions an economical, practical and efficacious method of reworking worn out cutters or drill bits to replace the worn-away cutting edges thereof with suitable hard, tough material so that the tool may be continued in use more or less indefinitely.

Still another object of this invention is to provide a method of manufacturing and rebuilding tool bits at a high production rate and wherein the tool bit portion to be rebuilt is heated to remove its original temper so that the bit when restored will not tend to break when subjected to impact during use.

Various other objects and advantages will be apparent as the invention is described in more detail.

Prior method of repointing worn cutter bits have been proposed, as for example, where the bit is mounted on a holder so that the worn end of the cutter bit is held in an upright position and a rod of hard material is applied thereto while heating the same to melt the rod and transfer hard material to the bit to build it up. This method, while suitable for some types of tools, has several disadvantages, a number of which may be enumerated as follows:

(1) It is difficult to form a flat face along the cutting edge of a tool bit as desired;

(2) It is not practical by this localized heating method to hold the heat in the bit long enough to remove the original temper;

(3) Using an acetylene torch much heat is wasted that could be used to preheat other bits;

(4) The time and heat consumed in treating each bit individually is too great to make this method practical for commercial operation; and (5) Where a rod containing small particles of tungsten carbide, for example, is used, these particles of tungsten carbide settle away from the cutting edges, where it is desired, and form a brittle intermediate layer transversely of the tool bit which tends to cause the bit to break at this point.

In accordance with this invention, these disadvantages are eliminated, or substantially overcome for all practical purposes, by placing the tool bits which are to be rebuilt, face down on a suitable welding plate and welding a hard material thereon to form the cutting edge. The use of a heated welding plate is an important feature of the method in order to conserve heat and provide suitable pre-heating of the bits, the continued application of heat during preheating and welding being sufficient to remove the original temper from the bit.

Although the novel features which are believed to be characteristic of this invention will be pointed out more particularly in the claims appended hereto, the invention itself as to its objects and advantages, and manner in which it may be carried out, may be better understood by referring to the following description taken in connection with the accompanying drawings in which a specific embodiment thereof has been set forth for purposes of illustration.

In the drawings:

Figure 1 is a plan view of a rectangular shaped rotatable table supporting a welding plate and showing tool bits positioned thereon for refacing;

Figure 2 is a fragmentary sectional view on an enlarged scale and taken substantially on the line 2—2 of Figure 1 and looking in the direction of the arrows;

Figure 3 is a perspective view of a rebuilt tool bit;

Figure 4 is a detail sectional view partially broken away and illustrating a worn tool bit on a welding plate in position to have the cutting edge applied, the same extending over the offset in the face of the welding plate;

Figure 5 is a similar detail sectional view as in Figure 4 illustrating the tool bit after replacing the cutting edge in accordance with this invention, the same having extra metal added to form a reinforcing layer along the cutting edge;

Figure 6 is a fragmentary end elevational view of the rebuilt tool bit as shown in Figure 5;

Figure 7 illustrates an arcuate-shaped refaced tool bit suitably positioned on a similarly curved welding plate and backing support;

Figure 8 is a plan view illustrating a circular rotatable table for supporting a welding plate similarly as in Figure 1, portions of the circular table being shown broken away; and Figure 9 is a detail sectional view partially broken away and showing a tool bit positioned on the circular table of Figure 8.

Referring to the drawings in more detail, wherein like reference characters indicate like parts throughout the several views, it is to be noted that a tool bit, generally designated 10, the cutting edge of which is worn away, as indicated at 12 (Figure 4) and which is to be built up is positioned on a welding plate or jig 14. This welding plate is preferably formed of copper or similar metal or alloy having a relatively high thermal conductivity. The welding plate may be suitably supported on a rectangular-shaped table as shown at 16 in Figure 2, or a circular rotatable table such as shown generally at 17 in Figure 9 may be employed.

A number of dull or worn bits are placed side by side on the welding plate with the face of the bits being laid down in close contact with the plate. In this manner the heat of the welding torch during application of the cutting edge to a bit will also pre-heat the next bit in the row to be refaced. The tool bit will absorb heat from the welding plate and pre-heat the entire structure before the cutting edge is applied. Bits thus pre-heated absorb more heat during the process of applying the cutting edge so that the original temper of the tool is removed which is desirable. The cutting edge is suitably applied by heating a welding rod of hard material, such as tungsten carbide, tool steel or the like. An acetylene blow torch or similar oxygen-hydrogen flame may be used to fuse the rod as the same is held against the tool bit portion to transfer a part of the rod thereto. The process results in the building-up or remaking of the tool and replacement of its cutting edge.

The pre-heating and welding of the cutting edge on the tool while the same is in continuous contact with the hot welding plate withdraws the original temper from the tool thus overcoming the tendency of the bit to fracture when subjected to impact during cutting operations. In carrying out the process, the bits are placed face down on the welding plate 14, as illustrated in Figures 4 and 5, not only to provide a heated welding plate and pre-heating treating of the tool bit but also so that when the cutting edge 18 is applied as described the bottom or face portion, as indicated at 20 in Figures 2 and 3, of the rebuilt tool is formed with a flat face which is desirable in order to provide a faster and easier cutting tool. Another advantage obtained by applying the cutting edge to the tool bits while the same are lying face down on the welding plate is that when using a welding rod containing tungsten carbide, the small particles of tungsten carbide, such as illustrated at 24 in Figure 5, do not melt from the heat of the welding torch, but settle to the bottom or face of the cutting edge during the welding operation. This settling out of the tungsten carbide provides a reinforcing super hard layer extending along the face of the cutting edge and having its principal axis parallel to the longitudinal axis of the tool bit. This reinforcing layer enhances the strength of the tool bit cutting edge and eliminates the tendency for the refaced tool bit to break under impact at the weld juncture and along an axis transversely of its longitudinal axis, as tends to occur when the tool bit is welded in an upright position.

In order to provide for improved fusion between the bottom structure of the cutting edge, an offset portion, generally indicated at 26, is formed in the welding plate and the tool bit is positioned on the plate so that the offset lies just behind the worn off part of the tool bit which is to be replaced. As illustrated in Figure 4, the offset portion forms a lower planar surface, preferably representing about $\frac{1}{32}$ of an inch undercut surface, which extends to the outer edge of the welding plate. The small space thus provided by the offset 26 permits heat from the welding torch to flow to the underside of the bit and heat the tool bit quickly as well as promoting better fusion of the metal along the bottom of the bit while at the same time reinforcing the cutting edge as illustrated in Figure 5.

Where the dull or worn bit to be sharpened or replaced has a curved face, as shown at 28 in Figure 7, the welding plate 30 and supporting base 32 is curved in like manner to fit the contour or surface configuration of the tool bit.

In the preferred method, a welding rod containing cobalt, tungsten carbide particles and mild steel is used. However, if this welding material is unavailable a high grade tool steel may be employed for replacing the cutting edges of the tool bit in accordance with this invention.

The heat from an acetylene welding unit is applied to the dull or worn portion of the bit until the surface of this portion is heated to just below the melting point wherein the metal begins to sweat. During this time, the flame or heat is also applied to the end of the welding rod, which is preferably held a fraction of an inch away from the worn end of the bit until the rod begins to melt. The melting end of the welding rod is then touched to the heated dull or worn end of the bit. As soon as contact is made between the rod and the tool bit, the heat of the torch is applied to the juncture and as much of the rod is melted and transferred to the tool bit as required to replace the cutting edges of the same while at the same time withdrawing the unmelted portion of the rod from the molten mass which has a tendency to follow the unmelted rod. While melting the rod, the unmelted portion preferably rests on the copper plate 14 and when the rod is withdrawn from the molten mass it is retained in contact with the welding plate. This procedure conserves heat and assists in maintaining the welding plate hot.

The process, when using a tungsten carbide rod, tends to cause the deposition of small particles of tungsten carbide along the bottom and face of the build-up cutting edge as illustrated in Figure 5, as aforementioned. This leaves more of the mild steel constituent and cobalt on the top of the molten mass which will form the backing of the cutting edge giving it greater strength and toughness.

While the welding plate for convenience is preferably supported on a rotating table, as shown, it will be obvious that a stationary table or other suitable support may be used when desired. Further, while the method of the invention has particular utility in the replacement and building-up of cutting edges of tool bits for mining machine chains, the method of this invention is equally applicable for building-up or re-making cutting edges of other tools or the like. Moreover, other refractory welding rod material may be used such as tantalum carbide or carbide mixtures alloyed or bonded with cobalt, nickel, iron, steel or the like.

From the foregoing description it is believed that the steps of the method and the advantages thereof will be readily understood by those skilled in the art. While certain novel features of the invention have been disclosed and are pointed out in the annexed claims, it will be understood that various omissions, substitutions and changes may be made by those skilled in art without departing from the spirit and scope of this invention.

Having described the invention, what is claimed as new is:

1. A method of applying a cutting edge to a tool bit which comprises placing a plurality of tool bits to be rebuilt face down on a metal plate, and applying a welding rod of tungsten carbide and mild steel thereto, heating said rod to melt the same and transfer a portion of said welding rod to each tool bit to build up the cutting edge of said bit while the same lies on said metal plate forming a flat face along its cutting edge and a reinforcing super-hard layer extending along the face of the cutting edge having its principal axis parallel to the longitudinal axis of said tool bit.

2. A method as claimed in claim 1 wherein said tool bit is heated by a flame directed around and beneath said tool bit end and wherein said tool is heated to cause removal of its original temper.

3. The method of restoring the cutting surfaces of individual worn tool bits which comprises placing a plurality of separate worn tool bits in adjacent, side by side relation upon a heat conductive welding plate in a face down position, applying the end of a rod of hard material to the worn cutting surface of one of the worn bits, heating the rod and the one bit to transfer material from the rod to that bit to produce a renewed cutting surface thereon while effecting transfer of heat from that bit by the welding plate to an adjacent bit for preheating the latter prior to forming a renewed cutting surface thereon.

4. That method of restoring the cutting surfaces of worn tool bits which comprises placing a plurality of worn tool bits in adjacent, side by side relation upon a heat conductive welding plate in a face down position, applying the end of a rod of hard material to the worn cutting surface of one of the worn bits, heating the rod and the one bit to transfer material from the rod to that bit while effecting transfer of heat from that bit by the welding plate to an adjacent bit for preheating the latter, effecting a flow of heat from that bit being restored, by the welding plate to another bit in which the cutting surface restoring operation has been completed for heat treating the same.

5. A method for reconditioning the cutting surfaces of worn tool bits which comprises placing a plurality of worn tool bits in flat, face down position, in adjacent side by side arrangement upon a metal welding plate having high heat conducting characteristics, restoring the worn cutting surface of one tool bit by heating and fusing material thereon from a rod of hard material, simultaneously causing transfer of heat from the tool bit to which the material is being fused by means of the heat conducting welding plate to a pair of adjacent tool bits for heat treating one of said adjacent bits which has had its cutting surface restored and for preheating the other of said adjacent bits in preparation for fusing a renewed cutting surface thereto.

6. The method of claim 3, wherein the tool bits are positioned with their worn cutting surfaces overhanging the offset portion of a stepped welding plate to provide a small clearance therebetween, the transfer of material from the rod to the worn cutting surface being continued until the transferred material upon the worn cutting surface establishes contact with the step of the welding plate along a flat face.

7. The combination of claim 6, wherein the rod of hard material includes as its main constituents tungsten carbide particles and mild steel and the step of heating and fusing is continued until the tungsten carbide particles gravitate to that portion of the transferred material which is immediately adjacent to the welding plate, thereby concentrating the tungsten carbide particles in the flat face of the renewed cutting surface and leaving that portion of the transferred material which is opposite to the renewed cutting surface substantially free of said particles.

8. A method of restoring the cutting surface of a worn tool bit which comprises placing the tool bit which is to be treated prone upon a stepped welding plate in a face down position with the worn cutting surface of the bit overhanging the step of the welding plate in closely spaced position relative thereto, applying the end of a rod of hard material including as its main constituents tungsten carbide particles and mild steel to the worn cutting surface of the bit, heating the portion of the bit adjacent the worn cutting surface and the end of the rod and thereby transferring a portion of the rod and fusing the mild steel thereof to the worn cutting surface, continuing the transfer of material from the rod to the worn cutting surface until the latter has been provided with a renewed flat cutting surface which extends beyond the side of the bit into contact with the step of the welding plate and until the tungsten carbide particles gravitate to that portion of the transferred material which is immediately adjacent to the step of the welding plate, thereby concentrating the tungsten carbide particles in the flat face of the renewed cutting surface and leaving that portion of the transferred material which is opposite to the renewed cutting surface substantially free of said particles.

9. A method of restoring the cutting surface of a worn tool bit which comprises placing the tool bit which is to be treated upon a flat welding plate such that its worn surface is positioned slightly above the surface of the welding plate, applying the end of a rod of hard material including as its main constituents tungsten carbide particles and mild steel to the worn cutting surface of the bit, heating the portion of the bit adjacent the worn cutting surface and the end of the rod and thereby transferring a portion of the rod and fusing the mild steel thereof to the worn cutting surface, continuing the transfer of material from the rod to the worn cutting surface until the latter has been provided with a renewed flat cutting cutting surface which extends beyond the side of the bit into contact with the surface of the welding plate, whereby the heavier particles of tungsten carbide will settle predominantly adjacent the renewed flat cutting surface while the transferred material adjacent the worn cutting surface will be substantially devoid of tungsten carbide particles.

10. A method of restoring the cutting surface of a worn tool bit which comprises placing the tool bit which is to be treated upon a flat welding plate such that its worn surface is positioned slightly above the surface of the welding plate, applying the end of a rod of hard material including as its main constituents tungsten carbide particles and mild steel to the worn cutting surface of the bit, heating the portion of the bit adjacent the worn cutting surface and the end of the rod and thereby transferring a portion of the rod and fusing the mild steel thereof to the worn cutting surface, continuing the transfer of material from the rod to the worn cutting surface until the latter has been provided with a renewed flat cutting surface which extends beyond the side of the bit into contact with the surface of the welding plate, and until the tungsten carbide particles gravitate to that portion of the transferred material which is immediately adjacent to the surface of the welding plate, thereby concentrating the tungsten carbide particles in the flat face of the renewed cutting surface and leaving that portion of the transferred material which is opposite to the renewed cutting surface substantially free of said particles.

11. A method of restoring the cutting surface of a worn tool bit which comprises placing the tool bit which is to be treated prone upon a stepped welding plate in a face down position with the worn cutting surface of the bit overhanging the step of the welding plate in closely spaced position relative thereto, applying the end of a rod of hard material including as its main constituents tungsten carbide particles and mild steel to the worn cutting surface of the bit, heating the portion of the bit adjacent the worn cutting surface and the end of the rod and thereby transferring a portion of the rod and fusing the mild steel thereof to the worn cutting surface, continuing the transfer of material from the rod to the worn cutting surface until the latter has been provided with a renewed flat cutting surface which extends beyond the side of the bit into contact with the step of the welding plate, whereby the heavier particles of tungsten carbide will settle predominantly adjacent the renewed flat cutting surface while the transferred material adjacent the worn cutting surface will be substantially devoid of tungsten carbide particles.

References Cited in the file of this patent
UNITED STATES PATENTS

| Number | Name | Date |
|---|---|---|
| 1,733,241 | Scott | Oct. 29, 1929 |
| 1,803,875 | Stoody et al. | May 5, 1931 |
| 1,825,829 | Stoody et al. | Oct. 6, 1931 |
| 1,886,835 | Purnell | Nov. 8, 1932 |
| 1,927,818 | Brodersen | Sept. 26, 1933 |
| 1,955,044 | Ammann | Apr. 17, 1934 |
| 1,977,128 | Hawkins | Oct. 16, 1934 |
| 2,033,594 | Stoody | Mar. 10, 1936 |
| 2,261,228 | Cockrum | Nov. 4, 1941 |

OTHER REFERENCES

Hard-Facing by Fusion Welding by T. B. Jefferson, cited in The Welding Journal, January 1940.

Life of Drilling Bits Extended and Old Ones Repaired by Hardening Edges, by C. P. Bowie, cited in The Oil and Gas Journal, August 29, 1935.